(12) United States Patent
Suendermann et al.

(10) Patent No.: US 8,543,401 B2
(45) Date of Patent: *Sep. 24, 2013

(54) SYSTEM AND METHOD FOR IMPROVING PERFORMANCE OF SEMANTIC CLASSIFIERS IN SPOKEN DIALOG SYSTEMS

(75) Inventors: David Suendermann, New York, NY (US); Keelan Evanini, Philadelphia, PA (US); Jackson Liscombe, Brooklyn, NY (US); Krishna Dayanidhi, Jersey City, NJ (US); Roberto Pieraccini, New York, NY (US)

(73) Assignee: Synchronoss Technologies, Bridgewater, NJ (US)

( * ) Notice: Subject to any disclaimer, the term of this patent is extended or adjusted under 35 U.S.C. 154(b) by 1032 days.

This patent is subject to a terminal disclaimer.

(21) Appl. No.: 12/425,892

(22) Filed: Apr. 17, 2009

(65) Prior Publication Data

US 2010/0268536 A1 Oct. 21, 2010

(51) Int. Cl.
| | | |
|---|---|---|
| G10L 15/06 | (2013.01) | |
| G10L 15/18 | (2013.01) | |
| G10L 21/00 | (2013.01) | |
| G06F 17/28 | (2006.01) | |
| G06F 17/27 | (2006.01) | |
| G06F 17/21 | (2006.01) | |
| G06F 17/00 | (2006.01) | |
| G06K 9/62 | (2006.01) | |

(52) U.S. Cl.
USPC .............. 704/243; 704/5; 704/9; 704/257; 704/270; 704/10; 706/54; 382/224

(58) Field of Classification Search
USPC ............ 704/257, 5, 9, 10, 243, 275; 706/54; 382/224; 707/104.1, 5, 100
See application file for complete search history.

(56) References Cited

U.S. PATENT DOCUMENTS

| | | | | |
|---|---|---|---|---|
| 6,173,279 | B1 * | 1/2001 | Levin et al. | 704/9 |
| 7,487,095 | B2 * | 2/2009 | Hill et al. | 704/275 |
| 7,865,358 | B2 * | 1/2011 | Green et al. | 704/10 |
| 2007/0016399 | A1 * | 1/2007 | Gao et al. | 704/5 |
| 2008/0052076 | A1 | 2/2008 | Metz | |
| 2008/0168070 | A1 * | 7/2008 | Naphade et al. | 707/100 |
| 2008/0177547 | A1 * | 7/2008 | Yaman et al. | 704/257 |
| 2008/0294628 | A1 * | 11/2008 | Shoval et al. | 707/5 |

(Continued)

OTHER PUBLICATIONS

D. Suendermann, et al. 2009. From Rule-Based to Statistical Grammars: Continuous Improvement of Large-Scale Spoken Dialog Systems. In *Proc. of the ICASSP*, Taipei, Taiwan.

(Continued)

*Primary Examiner* — Edgar Guerra-Erazo
*Assistant Examiner* — Neeraj Sharma
(74) *Attorney, Agent, or Firm* — Frommer Lawrence & Haug LLP; Williams S. Frommer

(57) ABSTRACT

A method and apparatus for continuously improving the performance of semantic classifiers in the scope of spoken dialog systems are disclosed. Rule-based or statistical classifiers are replaced with better performing rule-based or statistical classifiers and/or certain parameters of existing classifiers are modified. The replacement classifiers or new parameters are trained and tested on a collection of transcriptions and annotations of utterances which are generated manually or in a partially automated fashion. Automated quality assurance leads to more accurate training and testing data, higher classification performance, and feedback into the design of the spoken dialog system by suggesting changes to improve system behavior.

53 Claims, 9 Drawing Sheets

(56) References Cited

U.S. PATENT DOCUMENTS

2008/0306995 A1* 12/2008 Newell et al. .............. 707/104.1
2009/0092322 A1* 4/2009 Erol et al. ..................... 382/224
2009/0198642 A1* 8/2009 Akkiraju et al. ................ 706/54

OTHER PUBLICATIONS

D. Suendermann, et al.. "C5," in *Proc. of the SLT*, Goa, India, 2008.
McCallam, et al., "Mallet: A Machine Learning for Language Toolkit." http://mallet.sc.umass.edu.2002.

* cited by examiner

SYSTEM AND METHOD FOR IMPROVING PERFORMANCE OF SEMANTIC CLASSIFIERS IN SPOKEN DIALOG SYSTEMS

BACKGROUND

1. Field of the Invention

The present invention relates generally to a system and method for spoken dialog systems.

2. Background Discussion

Automatic spoken dialog systems are often very complex. They may consist of hundreds of dialog states involving extensive dialog structures, have system integration functionality that communicates with backend databases or devices, support multiple input and output modalities, and can sometimes comprise more than 20 minutes in call duration. In order to keep a caller engaged in such environments, the use of human-like speech processing is critical, e.g., the incorporation of various degrees of spoken language understanding, mixed-initiative handling, and dynamic response generation. One type of spoken language understanding, called natural language understanding, on a large scale was first introduced to automated spoken dialog systems as call classifiers. Here, the caller was asked a general question at the top of the call, such as, "Briefly tell me what you're calling about today." The caller's utterance was transcribed using a speech recognizer, and the caller was routed to a human agent based on a class of the utterance produced by a semantic classifier. The human agent then interacted with the caller providing services including, e.g., technical problem solving, billing support, or order processing. Other interactions may not require free form natural language input from the caller, but the speaking of simple commands as instructed by prompts, like yes or no, typically referred to as directed dialog input.

Typically, spoken dialog systems are built using semantic classifiers for most or all of the dialog contexts, both for natural language as well as for directed dialog inputs. A semantic classifier is a program that provides a mapping between utterances a speech recognizer produces and one or more predefined semantic classes which represent different categories of meaning. Semantic classifiers can be rule-based, i.e. manually generated as a set of rules that provide said mapping, or statistical, i.e. based on a statistical classification model whose parameters are trained from data, i.e. transcribed training utterances (transcriptions) and their respective semantic meanings (annotations). There can also be combinations of rule-based and statistical classifiers. Statistical semantic classifiers are today used almost exclusively for natural language input, while rule-based classifiers are typically used for directed dialog input.

Once a spoken dialog system goes into production with the set of classifiers designed for the application, the system's performance may suffer due to a variety of reasons, e.g.:

0. semantic classifiers were built with no data (rules created out of the designer's expectation of what people would say in this specific recognition context),
1. semantic classifiers were built to span over several contexts while callers actually behave specifically to some of the contexts,
2. semantic classifiers were built on small amounts of data,
3. semantic classifiers were built on old or unrepresentative data.

Spoken dialog systems are often designed to emulate a human agent's role in the complexity of the services offered as well as in the length of interaction. At the same time, as dialog systems improve, so too do the expectations of callers. Several characteristics of modern dialog system design encourage callers to behave as if they were interacting with a human agent. Such characteristics include open-ended questions during the conversation and global commands such as "help" and "repeat" at every point in the dialog. This design encourages callers to say things that are not explicitly prompted by the context prompts in the dialog system. Furthermore, explicit directed dialog prompts in which callers are asked to choose an item from a list often unintentionally elicit out-of scope utterances from callers by offering choices that may be incomplete, too vague, or too specific.

Caller's behavior, however, is often unpredictable to an interaction designer. Even listening to hundreds of calls will hardly provide a broad understanding of what exactly is going on at every point in a dialog system that receives millions of calls every month. It is barely possible to satisfy this expectation with the still-common approach of using static, hand-crafted, rule-based semantic classifiers.

SUMMARY

The present invention is directed to a method and apparatus for providing

Disclosed is a method for optimizing speech processing in a spoken dialog system. The method comprises: providing an initial set of semantic classifiers; collecting and processing a plurality of utterances using the semantic classifiers; transcribing the collected set of utterances; annotating the collected utterances with a semantic category; training a classifier update candidate for the initial set of semantic classifiers using data from the annotated utterances; comparing a performance of the update candidate against the initial set of semantic classifiers by testing the update candidate and the initial set of semantic classifiers against a baseline criterion; and upgrading the initial set of semantic classifiers with the update candidate if the update candidate outperforms the initial set of classifiers. The method can also include applying a quality assurance criterion to the annotated utterances before training the classifier update candidate.

Utterance collection can be selected from: all contexts of the spoken dialog system; a subset of contexts of the spoken dialog system; a fixed number of utterances per context of the spoken dialog system; and all utterances processed by the spoken dialog system in a certain time frame.

The method can further include deriving testing data and training data from the data from the annotated utterances. The method of can also include further deriving development data and training data from the training data. The development data can be used to optimize the parameters used to generate the classifier update candidate.

The method can also include logging data associated with the collected set of utterances. Logging data can include storing instances of speech recognition events identified by a speech recognition device at the semantic classifiers together with logging data for the semantic classifiers. The logging data is can include a name and version of an active classifier; a classifier name and version resulting in a highest classification score of the utterance; date and time in which the utterance was recognized; data about a context in which the utterance was recognized; the speech recognizer's hypothesis of the utterance; an acoustic confidence score associated with the speech recognizer's hypothesis of the utterance; the speech recognizer's n best hypotheses of the utterance; an acoustic confidence score associated with the n best hypotheses of the utterance; a semantic classification result for the speech recognizer's hypothesis; a semantic confidence score associated with the semantic classification result; m best semantic classification results selected from a plurality of the semantic classification results for the speech recognizer's hypothesis; a semantic confidence score associated with the m best semantic classification results; m·n best semantic classification results for the n best speech recognition hypotheses; a semantic confidence score associated with the m·n best semantic classification results; speech data; data about a spoken dialog system; data about a caller; and data about the utterance.

The quality assurance criteria can include: completeness of the annotated utterances; consistency of the annotated utterances; congruence of the annotated utterances; correlation of the annotated utterances; confusion of the annotated utterances; coverage of the annotated utterances; and corpus size of the annotated utterances.

The trained update candidate can be used to replace classifier parameters with new parameters while keeping the initial classifier in place. The trained update candidate can also be used to replace the initial classifier with a new classifier. The new classifier can include a rule-based classifier, a statistical classifier, or a classifier that is part rule-based and part statistical.

The method can also include using the data from the annotated utterances to automate either or both of the transcription and annotation of utterances.

The training can further include training a speech recognizer using the data from the transcribed utterances, the speech recognizer being configured to respond to specific data processed by a specific spoken dialog system. The training can also include: training of language models; training of acoustic models; training a global speech recognizer; and training a context-dependent speech recognizer.

The method can further include automating the transcription by transcribing the utterances using the trained speech recognizer.

The method can also further include receiving a confidence score for the utterance from the speech recognizer; establishing a threshold corresponding to the confidence score; testing the confidence score against the threshold; and accepting the automated transcription if the confidence score meets the threshold. Establishing a threshold corresponding to the confidence score can include: establishing a maximum error threshold; applying the speech recognizer to a set of test utterances distinct from the utterances the speech recognizer was trained on producing speech recognition hypotheses and confidence scores for each of the processed utterances; and determining the minimum confidence score for which those utterances whose confidence score exceeds this minimum score produce an error lower than the maximum error threshold. The error threshold can include a word error rate and a sentence error rate.

The annotation can include includes partially automating the annotation. Performing automated annotation of utterances can be based on models trained on the data from the annotated utterances. An utterance that is similar or identical to a previously annotated utterance can be automatedly assigned the same semantic class as the previously annotated utterance. The automated annotation can include applying an initial classifier to the utterances to be annotated. The initial classifier can include a statistical classifier, a rule-based classifier, and a classifier that is partially rule-based, partially statistical.

The comparing can include: measuring baseline performance by applying a baseline classifier to a speech recognition hypotheses generated by the speech recognizer on the stored data about utterances. The comparing can also include measuring the baseline performance by comparing output classes produced by the set of classifiers used by the system applied to a speech recognition hypotheses generated by the speech recognizer for given utterances with the annotations of the same utterances.

The upgrading can include manually upgrading the initial semantic classifier with the update candidate and performing an automated upgrade of the initial semantic classifier with the update candidate. The method can further include repeating the optimization process in an iterative cycle. The method can further comprise, when the update candidate does not outperform the initial semantic classifier: maintaining the initial semantic classifier; continuing the collection of utterances; and repeating the optimization process.

The method can further comprises, when the initial set of semantic classifier are upgraded with the update candidate, repeating the optimization process using the updated classifiers as the initial set of classifiers in a next iteration.

The method can further comprise providing a remote hosting service for at least one of the steps of the optimization process. The method can also comprise incorporating a module into a spoken dialog system for at least one of the steps of the optimization process.

Disclosed is a spoken dialog system, comprising a computer including a processor, and memory, and including: a signal input for receiving an audio input; a speech recognition engine; a data store comprising an initial set of semantic classifiers; a data store for a plurality of utterances received via the audio input; a data store for storing transcribed utterances; a data store for storing annotated utterances; a semantic classifier component including a semantic classifier program for, when executed by the processor, mapping the utterances to a set of semantic classes; a classifier update generation component including a program for, when executed by the processor, generating an update candidate for the initial set of semantic classifiers using data from the annotated utterances; and a comparison component including a program for, when executed by the processor, comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers. The system can also include a quality assurance component including a program for, when executed by the processor, applying quality assurance criteria to the annotated utterances.

The system can further include a data derivation component including a program for deriving testing data and training data from the annotated utterances. The system can further include an update generation speech recognition engine included in the update generation component and the deriving component can further includes program instructions for further separating the training data into training data and development data, and can further include program instructions for, when executed by the processor, optimizing the parameters used to generate the classifier update candidate using the development data.

The system can include a logging component including program for, when executed by a processor, logging and storing data associated with the collected set of utterances. The logging data can include a data store for storing instances of speech recognition events identified by the speech recognition engine at the semantic classifiers together with logging data for the semantic classifiers.

The quality assurance criteria included in the system can include: completeness of the annotated utterances; consistency of the annotated utterances; congruence of the annotated utterances; correlation of the annotated utterances; confusion of the annotated utterances; coverage of the annotated utterances; and corpus size of the annotated utterances.

The generated update candidate of the system can be used to replace classifier parameters with new parameters while keeping the initial classifier in place. The generated update candidate can be used to replace the initial classifier with a new classifier.

The system can further include: a transcription component including a program that, when executed by a processor automates the transcription of the utterances. The system can also include an annotation component including a program that, when executed by a processor, automates the annotation of the utterances.

The system can further include a program for, when executed by a processor, training a speech recognition engine using the data from the annotated utterances, the speech recognition engine being configured to respond to specific data processed by a specific spoken dialog system. The training program can include program instruction for, when executed by a processor: training of language models; training of acoustic models; training a global speech recognizer; and training a context-dependent speech recognizer.

The system can include a transcription component including a program that, when executed by a processor, automates the transcription of the utterances; wherein said transcription component can include the trained speech recognition engine. The transcription component can further include program instructions for, when executed by the processor: receiving a confidence score for the utterance from the speech recognition engine; establishing a threshold corresponding to the confidence score; testing the confidence score against the threshold; and accepting the automated transcription if the confidence score meets the threshold. The transcription component's program instructions can further include: establishing a maximum error threshold; applying the speech recognition engine to a set of test utterances distinct from the utterances the speech recognition engine was trained on producing speech recognition hypotheses and confidence scores for each of the processed utterances; and determining the minimum confidence score for which those utterances whose confidence score exceeds this minimum score produce an error lower than the maximum error threshold thereby establishing a threshold corresponding to the confidence score. The error threshold can include a word error rate and sentence error rate.

The system can further comprise a comparison speech recognition engine included in the comparison component and the comparison program including program instructions for, when executed by the processor, measuring baseline performance by applying a baseline classifier to the speech recognition hypotheses generated by the comparison speech recognition engine on the stored data about utterances. The comparison program can also include program instructions for: measuring the baseline performance by comparing the output classes produced by the set of classifiers used by the system applied to the speech recognition engine's hypotheses for given utterances with the annotations of the same utterances.

The system can include an upgrading program that, when executed by the processor, comprises: program instructions for performing an automated upgrade of the initial semantic classifier with the update candidate. The upgrading program can further include program instructions for repeating the optimization process in an iterative cycle.

The system can further comprise a remote hosting service for at least one of the components of the system. At least one of the components can be included in the system as a separate module that can be incorporated into a spoken dialog system.

Other embodiments of the present invention include the methods described above implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
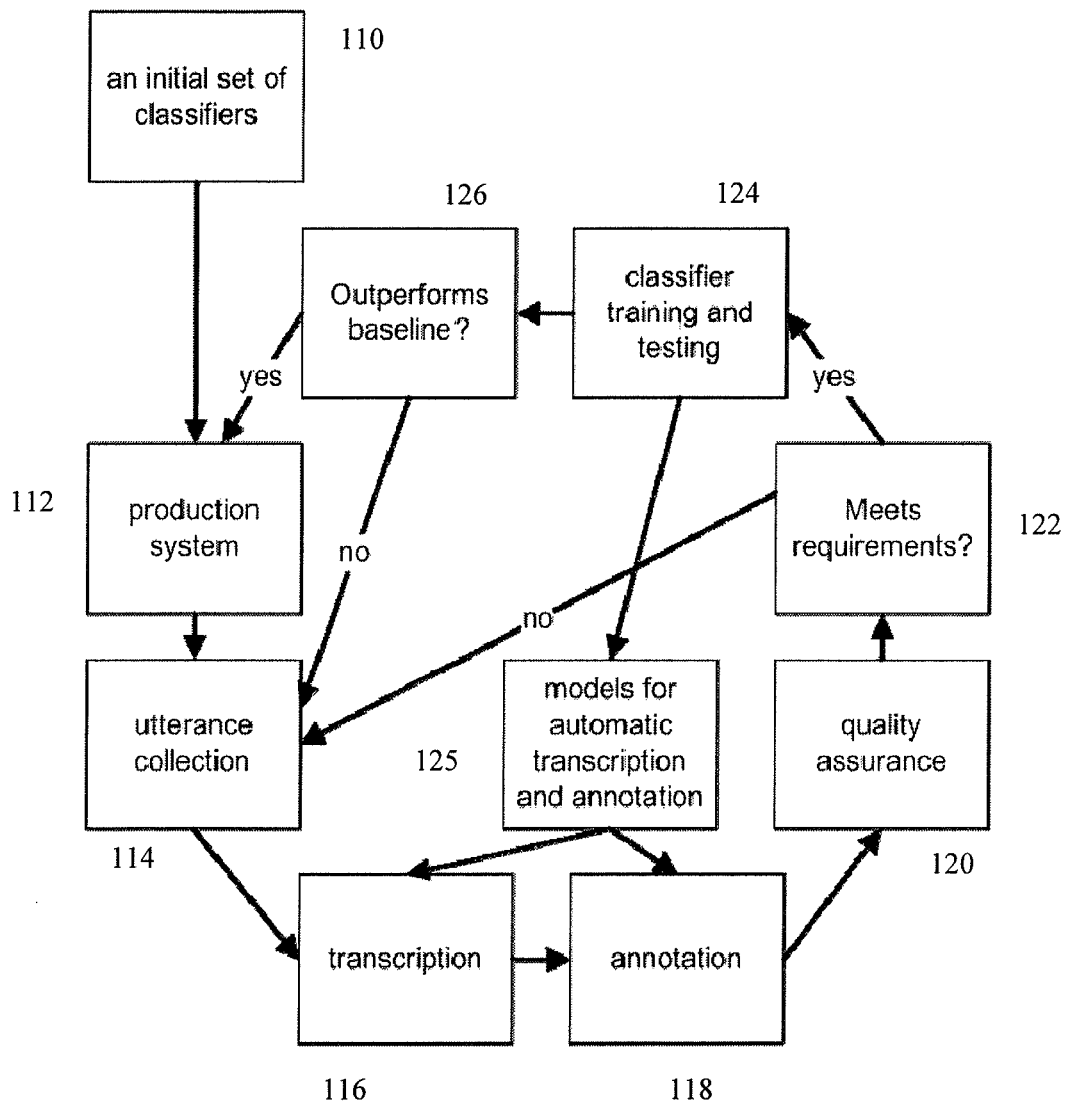
FIG. 1 illustrates a flow chart of a high-level view of the continuous improvement cycle according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Disclosed is a system and method to continuously improve dialog context performance by using caller utterances to tune classifiers and use them at every dialog recognition context. As outlined herein, utterance collection, transcription, annotation, language model and classifier training, baseline testing, and classifier releasing are carried out partially or wholly automatedly, in a continuously running cycle. The term "grammar" or "speech recognition grammar" as used herein, refers to a rule or script for a speech recognition engine that is used to recognize an utterance; and in particular, attempts to describe all possible sequences of words (i.e., word strings) processed by a speech recognizer. As used herein, the term "classifier" or "semantic classifier" refers to, inter alia, a method to classify and map recognized utterances to an associated class. As explained above, a semantic classifier is a method that provides a mapping between utterances a speech recognizer is able to recognize and one or more predefined classes which represent different categories of meaning. Semantic classifiers can be rule-based, i.e. manually generated as a set of rules that provide said mapping, or statistical, i.e. based on a statistical classification model whose parameters are trained from data, i.e., transcribed training utterances (transcriptions) and their respective semantic meanings (annotations). There can also be combinations of rule-based and statistical classifiers. A classifier can take, among other things, a recognized sequence of words output from a speech recognizer—a hypothesis—and assign a meaning thereto, as learned by transcription and annotation of utterances.

In one embodiment, there is disclosed is a system and method based on the collection of speech utterances recorded in the recognition contexts of a given spoken dialog system and their transcription and annotation. As transcription and annotation, if done manually, can be very time-consuming, also disclosed is a system and method to automate certain portions of the transcription and annotation involved. As the annotation task can be complex and different annotators working on the same context can lead to inconsistency, also disclosed is an application of an automated quality assurance step.

Utterance collection can be for all contexts of the spoken dialog system or for a subset of these contexts. It can include a fixed number of utterances per context or all utterances processed by the spoken dialog system in a certain time frame. A set of the utterances' transcriptions and annotations can be split into contexts where a context can be defined by the logical location of the recognition event in a spoken dialog system or by the presence of a certain original classifier or set of classifiers being active at the recognition time of the utterance. The set of the utterances' transcriptions and annotations can be further split into test and training data sets.

A baseline performance for a given context can be determined based on the comparison between annotations and classification results of the classifier using the test portion of the data. These results can come from the spoken dialog system run in production or from an offline experiment using identical (or similar) classifiers in conjunction with an identical (or similar) speech recognizer.

The training portion of the data can be used to tune parameters of the existing classifier or build a new classifier to improve its performance compared to the baseline on the test set. This classifier can be from a statistical or rule-based type or a combination of both.

If the original classifier with tuned parameters or the new classifier outperforms the baseline to a certain degree, the original classifier (parameters) can be replaced by the optimized one(s). The degree of minimum performance gain can be defined as (not limited to) relative gain, absolute gain, statistically significant gain. The replacement can be performed manually or automatedly.

Collection, transcription, annotation, quality assurance, training, and testing can be done in the scope of a repeated procedure, thereby keeping the classifiers up-to-date. Repetitions of this tuning cycle can benefit from increasing the portions of automatically generated transcriptions and annotations as well as increasing the amount of available training data, hence potentially increasing performance and decreasing the manual effort involved at the same time. Furthermore, the availability of more training data potentially allows for splitting contexts into finer contexts. For instance, a single classifier that was used at multiple places throughout a spoken dialog system can be replaced by several individual classifiers that cover more specific domains.

FIG. 1 shows a high-level flow chart of the continuous improvement cycle for optimizing semantic classification in a spoken dialog system in one embodiment of the invention.

An initial set of classifiers 110 is used in a production spoken dialog system 112. A plurality of utterances is collected 114 and processed using the semantic classifiers 110. Instances of utterance recognition events at these classifiers 110 are stored together with logging data including the name and version of the classifier(s) active, the semantic class resulting in the highest classification score of the current utterance, the context in which the utterance was recognized, the speech recognizer's hypothesis of the respective utterance, acoustic and semantic confidence scores of the respective utterance, the speech data itself, the spoken dialog system's version and additional information about the system, the caller, and the utterance. Alternatively, instead of the semantic class, the speech recognizer hypothesis, and acoustic and semantic confidence scores, the n·m best semantic classes of the n best speech recognizer hypotheses and their respective n acoustic confidence scores and n·m semantic confidence scores are stored. This logging data (or parts thereof) can be used for the continuous improvement cycle described in this invention.

The utterances are transcribed 116. This can be done manually or partially in an automated fashion. An exemplary transcription component can be, for instance, a program that plays back an utterance and gives the speech recognizer's hypothesis as a suggestion that the transcriber can modify if necessary. The automated transcription can be based on models trained on data formerly processed by the continuous optimization cycle 125, as described below.

Next, the utterances are annotated 118 with their respective semantic meanings. This can be done manually or partially in an automated fashion. The automatic annotation can also be based on models trained on data formerly processed by the continuous optimization cycle 125, as described below.

In order to achieve reliability and consistency among annotations, a quality assurance procedure 120 is carried out. Furthermore, criteria thresholds c flag whether it is appropriate to begin training a new classifier or classifier parameters for a given recognition context.

A quality assurance step can be applied which can include one or multiple quality assurance criteria, including:

1. Completeness check of annotations. Only utterances from a date range including a complete set of annotations are considered. This is to make sure that the classes and utterances match the real distribution.
2. Consistency check of annotations. Similar utterances, according to some defined similarity criterion, are required to be assigned to the same semantic class.
3. Congruence check of annotations. The class provided by an initial rule-based classifier for the transcribed utterance must produce the same result as the annotation. Of course, this check is only available when the utterance is in scope of the rule-based classifier.
4. Correlation check of annotations. Discrepancies amongst annotations assigned to the same utterances by different annotators are identified.
5. Confusion check of annotations. Completely annotated and consistency-checked data is checked against a distinct set of randomly selected and likewise annotated test utterances, classes of highest confusion are identified and examined.
6. Coverage check of annotations: Coverage refers to the scope of utterances that a classifier will classify into one of the classes expected as semantic input by the spoken dialog system in a given recognition context. To assure that the classifier is able to evaluate the input utterance in most of the cases, the coverage should be as high as possible. If an utterance is considered out-of-scope in the current context it can be assigned a garbage class. Examples include noise events, background speech, and cursing. However, reasonable utterances that are not yet covered by the spoken dialog system logic also can go into the garbage class. If the number of utterances ending up in the garbage class is too high, the issue can be addressed by changing the spoken dialog system logic or system prompts associated with the context to accommodate caller behavior and/or by adding new classes to the classifier.
7. Corpus size check: Test and/or training corpus size of annotated utterances for training a classifier must have a minimum size to produce reliable performance metrics and/or assure a certain coverage of utterances or classes. In order to benchmark classifier performance, a test set of a minimum size must be available.

The quality assurance criteria are discussed in further detail as follows:

In building a statistical classifier, a number of utterances typical of the task and a class associated to each of the utterances conveying their semantics is used. These utterance-class mappings are used to train a statistical model that later serves as a knowledge base to a classifier that is to map a new, and unlabeled, utterance to one of the set of possible classes. The more training data available, the better classification rates can be achieved. State-of-the-art classifiers are trained on hundreds of thousands of utterances. The annotation of such a number of utterances may keep several annotators busy for several months. While a combination of different peoples' annotations suffers from inter-labeler disagreement, intra-labeler disagreement can also be significant. This is due not only to the fact that annotators tend to map certain utterances to different classes depending on the time of the day or an annotator's mood, but there are also objective reasons for such inconsistencies:

Statistical utterance classifiers are an integral component of a dialog system which uses utterance classification to take certain actions. Thus, the semantic meaning of an utterance depends on the dialog context in which it occurs. Paradigm changes in the dialog logic may lead to a change of the canonical assignment between utterances and classes.

Such a paradigm change can lead to the creation of new classes or the collapsing or elimination of existing classes.

Utterances that show a potential overlap among several existing classes or which seem to belong to none of the given classes.

Utterances may be very vague or exhibit expressions that do not fit into the expected vocabulary, thus forcing annotators to heavily interpret vague language.

It could be contemplated that these sources of inconsistency may be addressed by the entire corpus at regular intervals. On the one hand, such revision rounds can barely be applied to the entirety of utterances due to limits of time and resources. On the other hand, a partial re-annotation—limited to certain classes or utterances containing certain keywords—will hardly cover all inconsistencies in the data. As aforementioned, considerable inter-labeler disagreement occurs as hundreds of thousands of utterances cannot be labeled by a single person in a reasonable time frame. These effects may lead to an undesirable annotation situation which finally would suggest to limit the data used for training to a couple of thousand (but clean) utterances rather than the great number of utterances.

COMPLETENESS OF ANNOTATIONS. The paradigm "there is no data like more data" is one of the driving forces of statistical speech and language processing. E.g., the performance of speech recognizers or automatic language translation does not seem to get to a saturation point even with very large amounts of training data. A caller's speech utterance is first processed by a large-vocabulary continuous speech recognizer whose utterance hypothesis is then classified by a statistical classifier. In order to train the classifier, speech utterances are collected in a recognition context of a production system. A spoken dialog system can process millions of calls per month. Only a fraction of these calls is transcribed and an even lower fraction is annotated due to the limitations of human resources where these processes are mostly manual.

Figure 2:
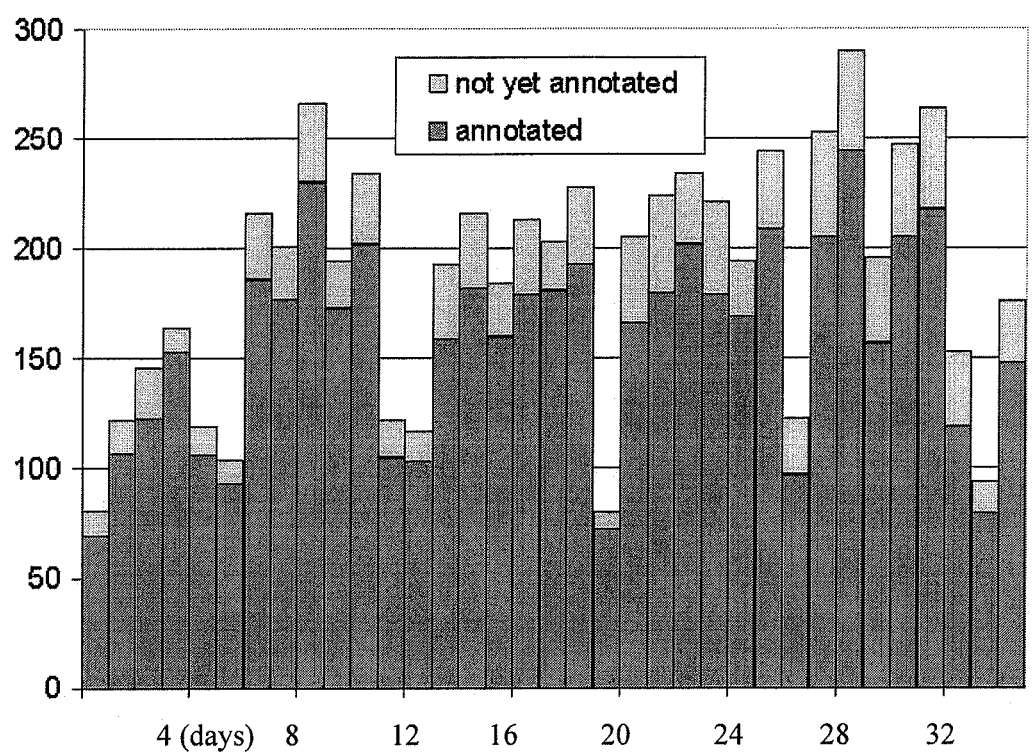
FIG. 2 is a bar graph illustrating an example of the effect of non-complete annotation.

In many cases, the number of transcribed utterances is growing faster than that of annotations. Due to the above formulated paradigm, the annotators would try to process as many utterances as possible. Therefore, the tendency is to concentrate primarily on frequent and easy utterances whose transcriptions are made available on a daily basis. This means, however, that a certain percentage of utterances remains unprocessed every day, as can be seen by the graph in FIG. 2, which shows an example of the effect of non-complete annotation. The example shows the daily transcription/annotation volume for a certain recognition context collected over 35 days. As shown therein, out of 6,521 utterances, 5530 were annotated, i.e., 85%.

After a number of utterances had been annotated, this data was split into train data and test data, the former used to build the classifier, the latter for assessing its performance in batch experiments. As soon as such a classifier went into production and started taking live calls, however, its performance turned out to be lower than that achieved in the batch experiments.

The reason was the omission of a part of the data (in the example of FIG. 2 around 15%) for training and test, namely that data which did not appear to produce quick results, i.e., less frequent utterances and difficult cases. In production, however, around 15% of all utterances belonged to the omitted type of utterances which had not been used for training and, consequently, resulted in misclassification in the majority of these cases.

To see what impact the absence (or, vice versa, the completeness) of data has on the performance of a statistical utterance classifier, in one prototypical experiment a statistical classifier was trained based on the naïve Bayes approach with boosting on utterances collected from a dialog application for a service provider (cable TV troubleshooting). Two classifiers were built: one was trained according to the "greedy" paradigm "there is no data like more data"—the annotators were provided 151,184 transcribed utterances and were asked to annotate as many utterances as possible within a four week time frame. At the end of this time frame, they had completed 97,237 annotations (64%).

The other classifier was trained based on the "thorough" paradigm "there is no data like complete data"—a similar amount of transcriptions was provided, but the annotators were asked to work on a day-by-day basis, i.e., they were supposed to complete the utterances collected over a one day time period before starting with the next. This resulted, after the completion of four weeks, in only 25,756 annotations (17% of the transcriptions).

Then, an experiment was carried out in which approximately 8000 (completely) annotated utterances distinct from the training data were used as a test set. Large vocabulary speech recognition was carried out on these utterances, and the resulting word string was processed by the above described statistical classifiers. The classification accuracy was measured as the number of correctly classified acoustic events divided by the total number of acoustic events (i.e., where nonsense utterances, background noise, and the like were taken into consideration).

The results are displayed in Table 1, which compares the performance of incompletely vs. completely annotated data for training a statistical utterance classifier.

TABLE 1

| Scenario | number of training utterances | accuracy |
| --- | --- | --- |
| incomplete | 97,237 | 62.6% |
| complete | 25,756 | 68.9% |

Although the training data of the complete paradigm comprises only about a quarter of the other scenario's data, it outperforms the latter by 6.3% absolute which equals a relative error reduction of 16.8%. This example clearly shows that the 'tail' of the utterances and classes, that is the less frequent candidates, can indeed have a significant impact on the classifier's performance.

CORRELATION OF ANNOTATIONS. Although the complete-data rule may be more powerful than the more-data rule, the joint hypothesis "there is no data like more complete data" holds true. Hence, in order to further push the performance of a certain application, in one experiment a team of up to five annotators annotated more than 300,000 utterances according to 250 distinct classes. Different annotators, however, have different opinions about how to label things—sometimes, it is deemed impossible to find a final agreement on the exact class where certain utterances belong due to differences in annotation styles. To isolate subsets of the annotators whose approaches achieve a high level of agreement, annotators were asked to label the same set of utterances independently of each other and then the kappa statistic was applied to determine the level of inter-labeler correlation. $\kappa > 0.7$ is usually considered a sufficient correlation for many tasks.

Table 2 shows values for the kappa statistic for an example set of 1000 utterances of the same domain used for each of the possible labeler combinations.

TABLE 2

| K | A1 | A2 | A3 | A4 | A5 | average |
| --- | --- | --- | --- | --- | --- | --- |
| A1 |  | 0.85 | 0.59 | 0.82 | 0.75 | 0.75 |
| A2 | 0.85 |  | 0.56 | 0.80 | 0.77 | 0.75 |
| A3 | 0.59 | 0.56 |  | 0.58 | 0.51 | 0.56 |
| A4 | 0.82 | 0.80 | 0.58 |  | 0.71 | 0.73 |
| A5 | 0.75 | 0.77 | 0.51 | 0.71 |  | 0.69 |

Here, the intra-annotator comparison featuring the trivial value of $\kappa=1$ is omitted. Additionally, the table contains the average of the values of each row which, in this case, bears a clear pattern; Annotators A1, A2, A4, and A5 show a rather high agreement, whereas A3's annotation style evinces a lower agreement. This discrepancy may be resolved by intensively training low-performing annotators such as A3 or discarding them from the particular annotation project.

CONSISTENCY OF ANNOTATIONS. Having selected a group of annotators adhering to the desired annotation style, a correlation of $\kappa=1$ still is not produced among them. Experience shows that annotators do not even agree with themselves on certain (complicated, vague, or ambiguous) utterances. To quantify this effect and help annotators to find cases of inter- and intra-labeler inconsistency, a procedure was set up which investigates whether identical utterances are associated with more than one class. These cases are corrected (if mistakes due to oversight), or they are subject to a discussion involving annotators, dialog application designers, and speech scientists. Another consistency comparison can then be carried out taking similar utterances into account by matching the bags of words of the analyzed utterances. This representation, used to reduce redundant information, can include exemplary steps, such as:

Stop words are removed according to a list of function words. The remaining words are stemmed using a stemmer algorithm. As is known in the art, a stemmer is a program or algorithm to produce the morphological root of a given inflected or derived word form—generally a written word form.

Multiple occurrences of words are eliminated.

The order of words is regularized (e.g., by alphabetic sort).

Table 3 shows an exemplary case of similar utterances inconsistently mapped to several classes detected. All involved utterances result in the bag of word "need on turn".

TABLE 3

| Utterance | class | Count |
| --- | --- | --- |
| Need to be turned on | BoxWontTurnOn | 2 |
| I need it turned on | ServiceNoService | 5 |

TABLE 3-continued

| Utterance | class | Count |
|---|---|---|
| It needs to be turned on | BoxWontTurnOn | 3 |
| Needs to be turned on | BoxOther | 2 |

Again, this example is taken from the utterance classifier at the open-ended prompt of a cable TV troubleshooting application.

Consistency analysis serves several purposes:
- It helps to remove annotation errors and normalize the data in order to assure quality and achieve highest classification performance of the utterance classifier.
- The rate of confusions per newly annotated utterance is a measure of the task complexity and of the familiarity of an annotator with the current task.
- It helps detect cases of major confusion which indicate that classes should be redefined, collapsed, or split or that annotation instructions are ambiguous.
- Overall, consistency analysis serves as a training tool for annotators and is used to get several annotators to achieve consistent performance and detect cases of high uncertainty.

CONFUSION ANALYSIS OF ANNOTATIONS. Consistency analysis helps to detect confusions in annotated data. However, there are types of confusions inherent to the classifier design which may not be apparent to the annotators. Similar wordings might convey clearly different meanings to a human being, but to a machine-based probabilistic classifier working on automatic speech recognition output, such utterances might very well be ambiguous. A simple example are the utterances "yes . . . no!" and "no . . . yes!" which in a yes/no context are annotated as no and yes, respectively, since the caller's attitude is derived from his latest pronouncement. A classifier, however, may not consider word order, consequently, both utterances are identical to such a classifier.

In order to identify where the classifier's weak points are, completely annotated and consistency-checked data to train an initial classifier is provided and applied to a distinct set of randomly selected and annotated test utterances. Looking at the confusion matrix of such an experiment points to areas of major confusion which are then subject to more careful inspection. Table 4 shows a confusion matrix of a classification experiment for a yes/no/operator scenario. The numbers are counts of confusions. As shown, a large percentage of operator requests is assumed to be out-of-scope (OOS) or confused with yes.

TABLE 4

| | | annotated class | | | |
|---|---|---|---|---|---|
| | | OOS | no | operator | Yes |
| predicted class | OOS | 106 | 19 | 26 | 13 |
| | no | 15 | 240 | 2 | 1 |
| | operator | 2 | 0 | 22 | 0 |
| | yes | 13 | 3 | 12 | 346 |

Furthermore, class-specific performance can be analyzed by counting all correct classification events for a given class (i.e. the count where the class appears in the column and in the row of the confusion matrix) and compare this number with the count of all classification events this class was involved in (i.e. the sum of all counts in the column and row where the class appears. For the above example, we get:

TABLE 4a

| class | correct | total | performance |
|---|---|---|---|
| OOS | 106 | 194 | 54.6% |
| no | 240 | 280 | 85.7% |
| operator | 22 | 64 | 34.4% |
| yes | 346 | 388 | 89.2% |

The performance numbers indicate that the out-of-scope and operator classes suffer performance issues and should be considered for revision.

CONGRUENCE OF THE ANNOTATIONS. As explained above, for the initial building of a statistical classifier, utterances of the target domain are required. In many conditions, such utterances can be collected by bootstrapping a rule-based classifier based on sets of expressions expected in the respective context and using this classifier in a live system. Utterances processed in this initial framework are collected, transcribed, annotated, and a first statistical classifier is built and tested on annotated reference data. As soon as the statistical classifier outperforms the rule-based version, the latter is replaced by the former. In regular intervals, new classifiers are built, tested, and implemented in the live application when their performance is significantly higher than that of their predecessors.

A rule-based classifier used for an initial collection of utterances is often not only a trivial collection of a few utterances expected in a current context, but may exhibit a complex structure incorporating several rule-based sub-classifiers with a significant vocabulary (such as classifiers handling requests for operator, repetition, holding, help), loops of phrases, typical affixes callers use, and so on. The number of different utterances described by such a classifier can be infinite (due to loops or recursion). Such a classifier can be used to test annotations, as it establishes a ground truth. Whatever class a rule-based classifier returns for an utterance must be identical to the class the annotator maps it to. Otherwise, the annotator made a mistake, or the rule-based classifier was erroneous, the latter being understood to be extremely rare. Consequently, the congruence between the output class of the rule-based classifier and the annotated class is another means of assuring quality of annotation.

Table 5 shows the utterance coverage of two example scenarios for which rule-based classifiers served as initial classifiers.

TABLE 5

| Classifier | number of classes | rule-based classifier coverage |
|---|---|---|
| yes/no/operator | 4 | 77.8% |
| modem type | 28 | 57.3% |

The percentage of utterances for which the rule-based classifier returns a class is rather high for the yes/no/operator example, introduced above with respect to Table 4, featuring only four classes. This coverage decreases, the more unpredictable the caller's language becomes. The second example comes from a context where callers are asked for the type of their modems. The answers tend to be more natural and conversational than in a yes/no context which explains the lower coverage. Nonetheless, more than half of all utterances are covered by the rule-based classifier.

Returning to FIG. 1, if quality assurance is met 122, a classifier update candidate for the initial set of classifiers can be trained using the data from annotated utterances 124. Whenever the data from the annotated utterances fulfills the above quality assurance requirements for a recognition context, the available data can be split into training and testing data. The training data can be used to generate a classifier (rule-based, statistical, or a classifier that is part rule-based, part statistical).

Optionally, the training data can be further partitioned into development and training data. The former can be used for optimizing the parameters used for generating the final classifier. Alternatively, the training step can only involve tuning of the classifier parameters while keeping the original classifier in place.

Once the update classifier is trained, the performance of the update candidate is compared against the initial set of classifiers by testing the update candidate and the initial set of semantic classifiers against a baseline criterion 126. The performance can be measured against the test data by comparing test utterance annotations with classification results obtained by applying the new classifier to speech recognition hypotheses created by a speech recognizer on the same stored speech utterances. The baseline performance can be measured equivalently by applying the set of baseline classifiers to speech recognition hypotheses created by a speech recognizer on the same stored speech utterances. Alternatively, the baseline performance can be measured by comparing the classifier hypotheses produced by the spoken dialog system in production with the annotations of the same utterances.

Accordingly, after building a classifier update for a recognition context, its performance, $P_{new}$, is compared to the performance of the classifier currently used in production, $P_{old}$, on the same test set. If $P_{new}$ is significantly better than $P_{old}$ then the update candidate, i.e., the new classifier (or classifier parameters), replace(s) the old one. Here, a statistical measure p of the difference between $P_{old}$ and $P_{new}$ is applied to verify that the classifier update candidate is reliably better than the current one. If the update candidate does not outperform the original one then the original classifier is left in production to collect more utterances with which to train a more accurate classifier (or classifier parameters) in the future.

Thus, if the new classifier (or, if applicable, the baseline classifier with new optimized classifier parameters) outperforms the baseline classifier with old classifier parameters, the classifier (or, if applicable, the classifier parameters) can be replaced by the new one(s). Parameters can include semantic confidence threshold, rule weights; class prior probabilities, and many others, depending on the classifier used. This replacement can be done automatically or manually.

The training and testing data used to generate the classifier update candidate can also be used to generate models to automate the transcription and annotation of utterances 125. For transcription, the training and testing data used to generate a new classifier or update classifier parameters can also be used to train one or multiple speech recognizers specific to typical data processed by the spoken dialog system. Training a speech recognizer can include the training of language models and/or acoustic models; it can be one global speech recognizer or multiple speech recognizers, such as multiple context-specific speech recognizers. This speech recognizer or these speech recognizers can be used to automatically transcribe new collected utterances. The decision whether to trust the automatic transcription can be made using utterance-based confidence scores (e.g., acoustic or language model scores) returned by the speech recognizer. There can be one or multiple thresholds associated with these scores which indicate whether an automatic transcription is to be accepted or not. This threshold or these thresholds can be trained based on manual transcriptions which are compared to automatic transcriptions by means of an error measure such as (but not limited to) word error rate or sentence error rate. There can be a maximum error measure found to be acceptable for automatic transcription on the basis of which the aforementioned threshold(s) can be determined.

The training and testing data used to generate a new classifier or update classifier parameters can also be used to automate portions of the annotation. Specifically, utterances which are similar or identical to an utterance annotated before can be automatically assigned the semantic class of the latter. Similar utterances can be determined by removing information (e.g., words, subwords) from the utterances under comparison. Additionally, automatic annotations can be provided by applying a rule-based classifier (which can be an earlier version used in the context of the currently trained classifier) to the utterances to be annotated. If this rule-based classifier contains a rule for an utterance it can be accepted as the annotation for this utterance. This original classifier can also be a statistical one or a combination of a rule-based and a statistical one.

The system and method can be adapted to be carried out in a repeated optimization cycle providing more and more data and producing better and better classifiers or classifier parameters. At some point after a number of iterations of the cycles, saturation in performance might be reached, at which the algorithm would not release subsequent classifier updates because statistically significant differences in performance are not found. However, the recognition context can still be incorporated into the continuous optimization cycle as a monitoring device. Thus when caller behavior changes over time the repeating cycle can seamlessly and correctly respond to this event. Reasons for caller behavior changes include, e.g., changes in the distribution of call reasons, system prompt changes resulting in emergence of unexpected utterances or disappearance of formerly frequently observed utterances, etc.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
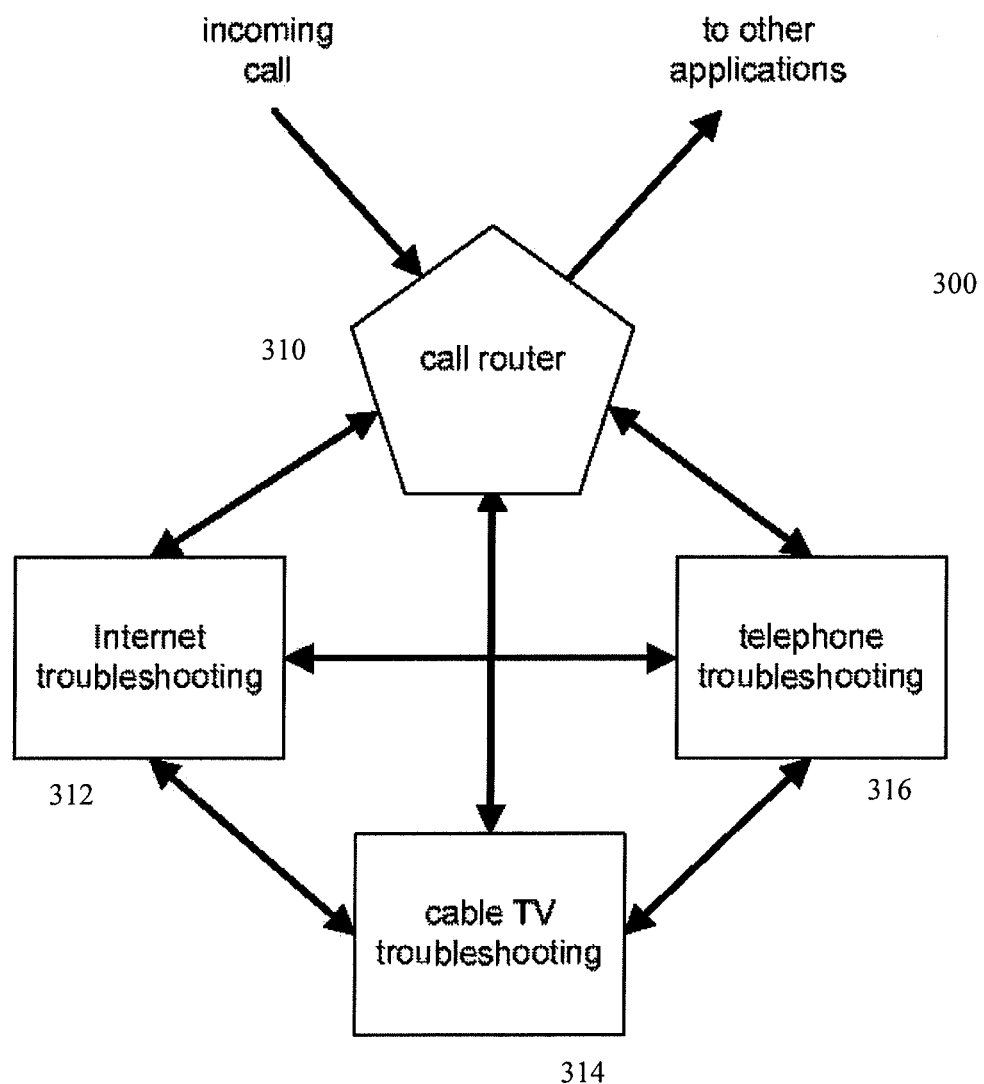
FIG. 3 illustrates an example of a dialog application comprising four individual dialog systems interacting with each other.

FIG. 3 shows an exemplary embodiment of a dialog application 300 comprising four individual dialog systems interacting with each other. In the exemplary embodiment, they are implemented in a "customer care" telephone portal of a large service provider (e.g. a cable service provider).

When customers call the hotline of the service provider, they are connected to a top-level call router 310 whose task is to determine the call reason and route the callers to the appropriate destination. This is done by accessing the callers' account information (using their telephone number as an identifier) and then asking either a general opening question such as "Briefly tell me what you're calling about today," or a caller-specific question such as "It looks like you called recently about your account. Are you calling about that now?" Depending on the caller response to the opening question and, potentially, to one or two follow-up questions, the most appropriate routing point is determined, and the call is transferred. If the call is about a technical problem with one or more of the provider's services (e.g., broadband Internet 312, cable TV 314, or telephone 316), the call is connected to one of the three respective troubleshooting dialog systems 312, 314, 316. If customers face problems with more than one service, they can be interconnected to one of the other troubleshooting dialog systems 312, 314, 316 or back to the call router 310.

An implementation of the embodiment follows. Table 6 gives an example of the parameter settings used for the continuous improvement cycle, and Table 7 provides an overview of the data resources and actual classifier performance over three months.

TABLE 6

Parameter settings

| criteria thresholds | |
|---|---|
| minimum test set size | 1,000 utterances |
| minimum coverage | 90% |
| performance thresholds | |

Performance:

$$P = \frac{\text{correctly classified utterances}}{\text{total utterances}} \quad P_{new} - P_{old} > 0$$

| significance: chi-square test | $p < 0.05$ |
|---|---|
| Classifiers | |
| language model | trigram + smoothing |
| classifier | naive Baynes + boosting |

TABLE 7

Data resources and classifier performance at three months.

| Utterances | 2,184,203 |
|---|---|
| calls | 533,343 |
| activities | 2,021 |
| classifiers | 145 |
| original average performance | 77.97% |
| average performance at 3 months | 90.49% |

Figure 4:
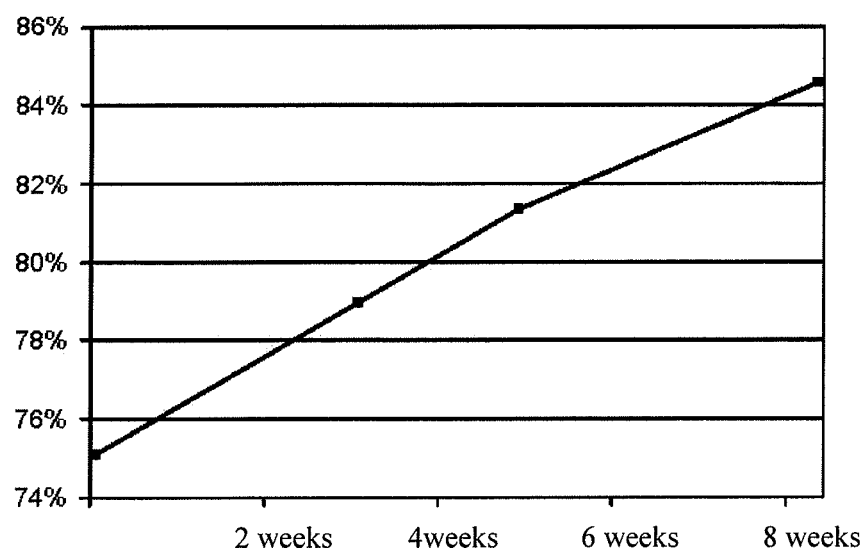
FIG. 4 is a graph showing an example of performance improvement according to one embodiment of the invention.

When a first version of the application was launched, the average performance of all rule-based classifiers was around 78%. This includes directed dialogs, lower performing activities with open prompts, and higher performing standard contexts (such as yes/no), all weighted by their frequencies of use. After three months, almost 2.2 million utterances had been transcribed and annotated and had circulated dozens of times through the continuous improvement cycle. Whenever a grammar significantly outperformed the most recent baseline, it was released and put into production leading to an incremental improvement of performance throughout the application. As an example, FIG. 4 shows the performance improvement of the top-level large-vocabulary semantic classifier that distinguishes more than 250 different classes. Almost every two weeks, there was enough data collected in the cycle that a new version could be released. Performance was not saturated at 100,000 collected utterances for this classifier, nevertheless. The overall performance of the application went up to more than 90% within three months of the introduction of the continuous improvement cycle. One observation is that for every one of the classifiers whose data met the quality assurance criteria, it outperformed the rule-based counterpart. The following two examples emphasize this finding:

Suppose callers have trouble with getting online, and they get transferred to the Internet troubleshooting system which helps them to get connected. At the end of this process, the callers are asked to access a certain website to make sure they are back online. At this activity, they are expected to respond with utterances such as "I am connected", "still no Internet", "repeat the address, please", or one of the global utterances "I need help", "hold on", "repeat", or "agent", etc. The manually tuned rule-based classifier exhibited a reasonably high performance of 90.6%. After collecting almost 8000 utterances for this context, a classifier was trained and reported a performance of 98.8%. This result was at first considered suspicious since it means a misclassification of only 12 out of 1000 utterances including garbage events. This was deemed impossible, and the classifier was initially not released. However, further investigation into the correctness of the testing procedure showed that this classifier did indeed perform at a near-human level.

In another context, callers having a problem with their digital video recorder (DVR) are asked what exactly the issue is. They may say "I would like to install my DVR", "I don't know how to record", "my DVR box is frozen", "I cannot turn on my box", and some other global utterances as in the above example. The rule-based classifier performed at 84.9%, which is relatively high for such a context with a large variability among the responses. Since this context is not reached very frequently in the application, there were initially only 1087 utterances available for the first round of the continuous improvement cycle. According to the quality assurance criteria formulated above with respect to, inter alia, a corpus size check, the minimum test size was 1000, so only 87 utterances remained for training. Remarkably, the classifier built on this sparse data set achieved a performance of 87.8% on the same test set, significantly outperforming the baseline classifier.

Accordingly, large-scale utterance collection, transcription, and annotation, in conjunction with a rigorous quality assurance process, can be used in the scope of a timely and continuous improvement cycle to successively replace classifiers and increase the overall performance of a dialog system significantly and systematically.

It is to be understood that the present invention can be implemented in various forms of hardware, software, firmware, special purpose processors, or a combination thereof. In one embodiment, the present invention can be implemented in software as an application program tangibly embodied on a computer readable program storage device. The application program can be uploaded to, and executed by, a machine comprising any suitable architecture.

Figure 5:
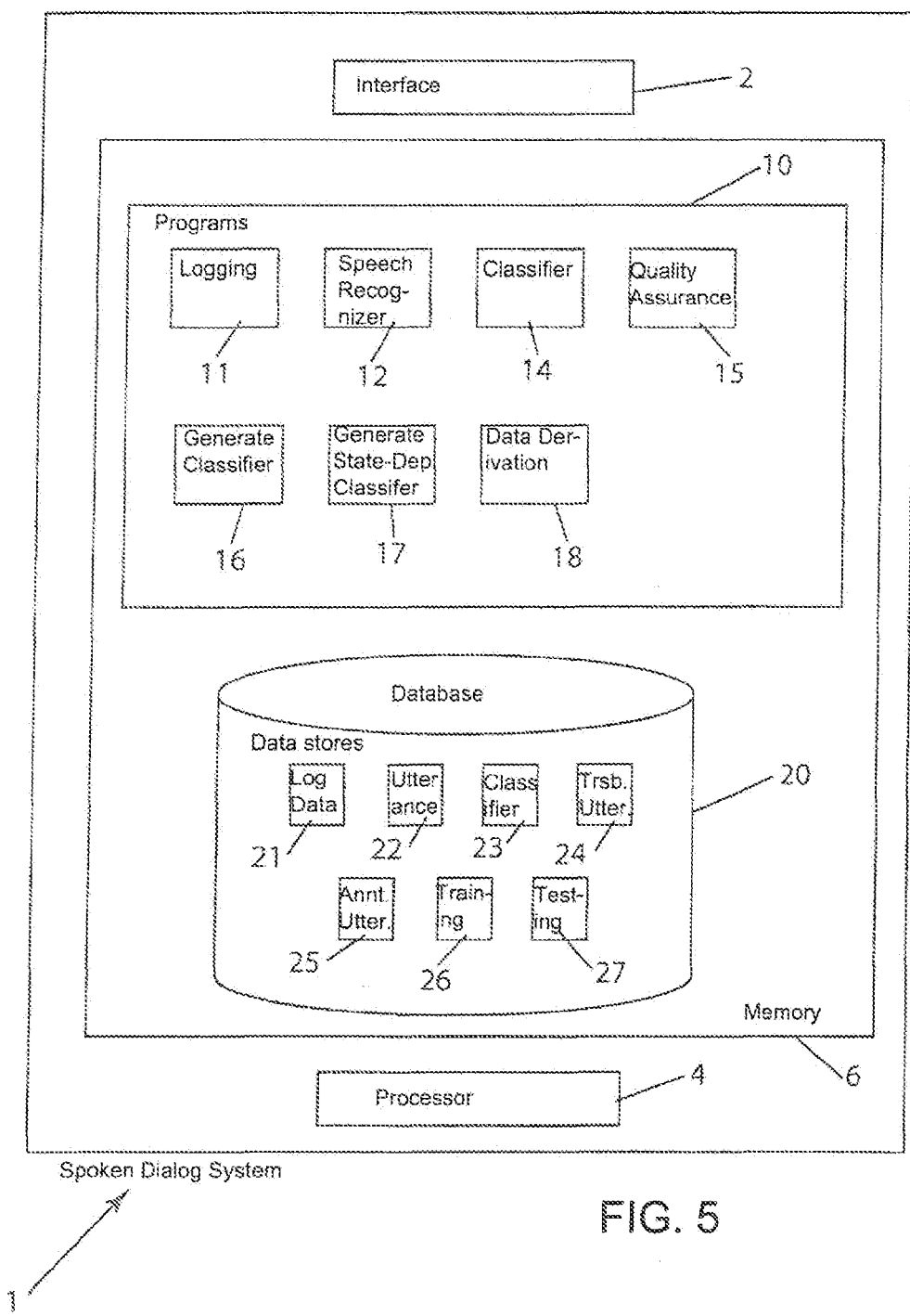
FIG. 5 shows a system overview for a system according to one embodiment of the invention.

FIG. 5 shows one embodiment of a system overview for a system for optimizing the performance of semantic classifiers in spoken dialog systems. As disclosed therein a spoken dialog system 1, comprises a computer including, a signal input/output, such as via a network interface 2, for receiving input such as an audio input, a processor 4, and memory 6, including program memory 10. The system 1 may be implemented on a general-purpose computer under the control of a software program. Alternatively, the system 1 can be implemented on a network of general-purpose computers and including separate system components, each under the control of a separate software program, or on a system of interconnected parallel processors. Although complex, it is believed that suitable software for performing the various functions described herein can be designed and constructed by computer programmers of ordinary skill.

Figure 5A:
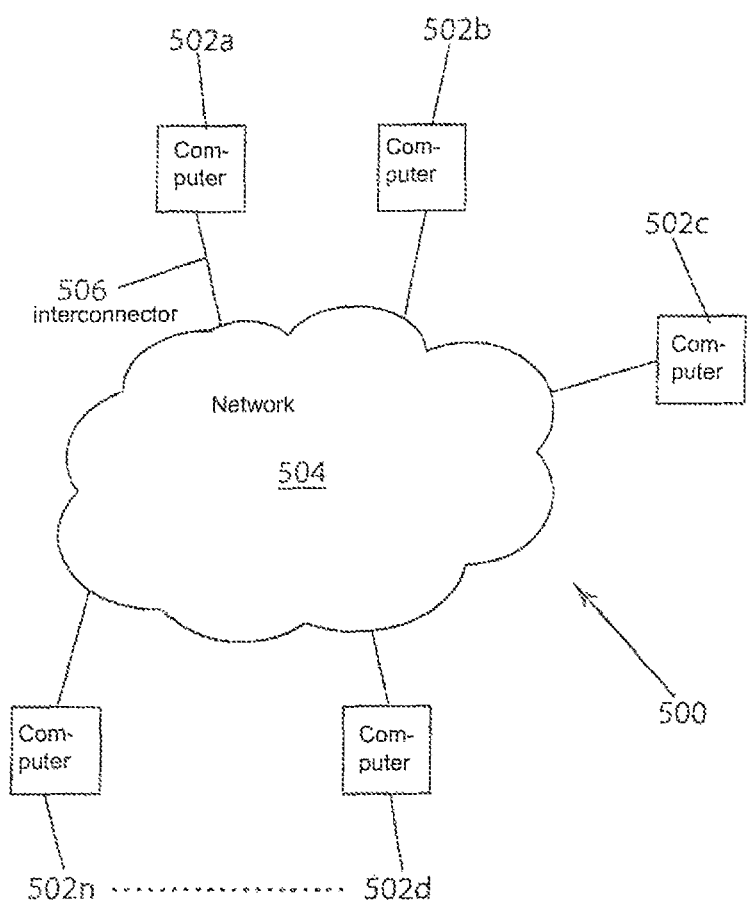
FIG. 5A shows an exemplary network environment adapted to support the present invention.

FIG. 5A shows a network environment 500 adapted to support the present invention. The exemplary environment 500 includes a network 504, and a plurality of computers, or computer systems 502 (a) ... (n) (where "n" is any suitable number). Computers could include, for example one or more SQL servers. Computers 502 can also include wired and wireless systems. Data storage, processing, data transfer, and program operation can occur by the inter-operation of the components of network environment 500. For example, a component including a program in server 502(a) can be adapted and arranged to respond to data stored in server 502(b) and data input from server 502(c). This response may occur as a result of preprogrammed instructions and can occur without intervention of an operator.

The network 504 is, for example, any combination of linked computers, or processing devices, adapted to access, transfer and/or process data. The network 504 may be private Internet Protocol (IP) networks, as well as public IP networks, such as the Internet that can utilize World Wide Web (www) browsing functionality, or a combination of private networks and public networks.

A computer 502(a) for the system can be adapted to access data, transmit data to, and receive data from, other computers 502 (b) ... (n), via the network or network 504. The computers 502 typically utilize a network service provider, such as an Internet Service Provider (ISP) or Application Service Provider (ASP) (ISP and ASP are not shown) to access resources of the network 504.

The computers 502 may be operatively connected to a network, via bidirectional communication channel, or interconnector, 506, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 504 may be used to feed, or provide data.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

For example, a computer hosting a speech recognition engine may communicate to a computer hosting a classifier program via local area networks, wide area networks, direct electronic or optical cable connections, dial-up telephone connections, or a shared network connection including the Internet using wire and wireless based systems.

Returning to FIG. 5, the system 1 includes a speech recognition engine (i.e. a speech recognizer) 12, which includes a grammar (not shown). The system also includes data storage memory 20 including a number of data stores 21, 22, 23, 24, 25, 26, 27 which can be hosted in the same computer or hosted in a distributed network architecture. Grammar is held in a grammar data store (not shown). The system 1 includes a data store for a plurality of utterances 22 received via the audio input. The system 1 further includes a classifier component including a classifier data store 23 comprising a set of semantic classifiers (i.e., an initial set of classifiers), as well as a semantic classifier program 14 for, when executed by the processor, mapping the set of utterances processed by the speech recognizer 12 to the set of semantic classifiers.

The system includes a data store for storing transcribed utterances 24 and a data store for storing annotated utterances 25. Such data can be stored, for example, on one or more SQL servers (e.g., a server for the annotation data and a server for the transcription data). The system also discloses a component which includes a program for deriving data 18. The program 18 derives data from the annotated utterances 25. For instance, the program 18 can be adapted to query the annotated utterances 25 so as to separate data from the annotated utterances 25 into training data 26 and testing data 27. As discussed herein, training data 26 and testing data 27 derived from the annotated utterances will not overlap, although in some instances this may be the case (e.g., there is too little data in the annotated utterances to exclusively separate into training and testing corpora).

A quality assurance component includes a program 15 for, when executed by the processor, applying quality assurance criteria discussed herein to the annotated utterances is also included in the system 1.

The system 1 also includes a component including a program 16 for, when executed by the processor, generating an update candidate for the initial set of semantic classifiers using data from the annotated utterances.

The system can also include a logging component including logging program 11 for, when executed by a processor, logging and storing data associated with the collected set of utterances. A logging data store 21 can store instances of speech recognition events identified by the speech recognition device at the semantic classifiers together with logging data for the semantic classifiers.

Figure 6:
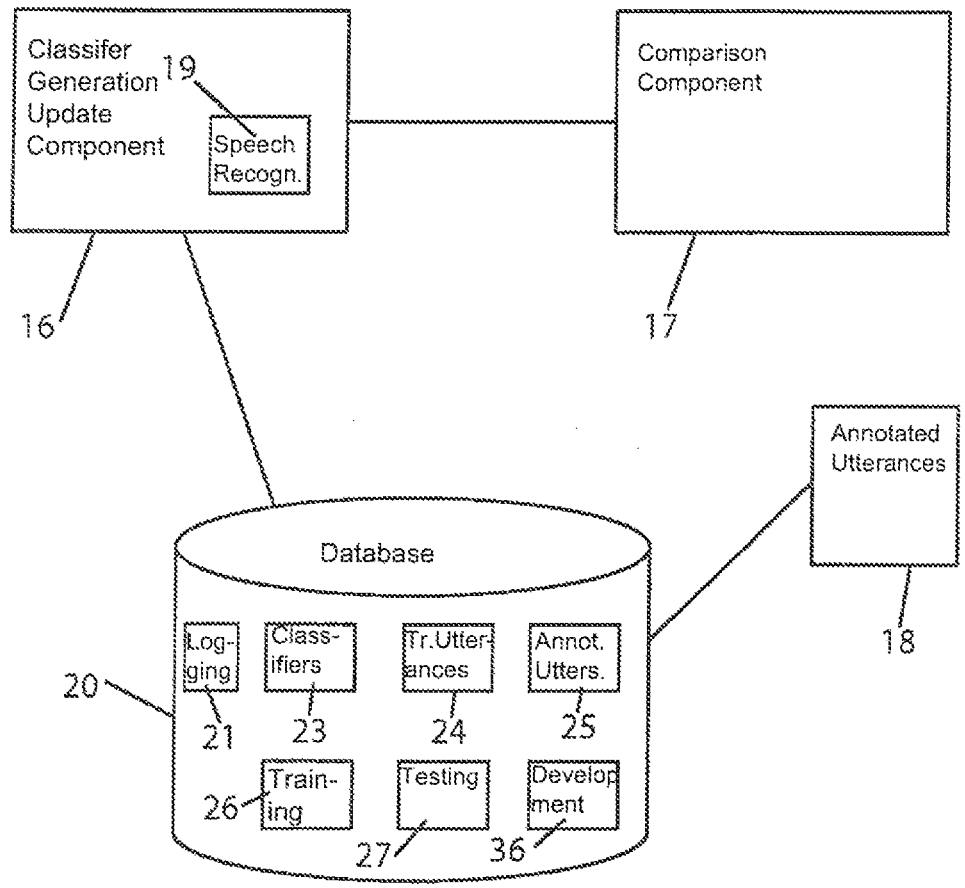
FIG. 6 shows an example of an embodiment of an update generation component according to one embodiment of the invention.

FIG. 6 shows one alternate embodiment of an update generation component including a program to generate an update candidate 16 for the initial set of semantic classifiers using data from the annotated utterances 25. The component 16 is operatively connected to a database 20 including transcription data 24 and annotation data 25. A data derivation component 18 including program for deriving data derives testing data 27 and training data 26 from the annotated utterances. The program 18 also derives training data 26 and development data 36 from the training data 26. Accordingly, the update generation component 16 is operatively connected to a data store for training data 26 and a data store for development data 36 that is derived from training data. The component also includes an update generation speech recognition engine 19. The training data 26 can be used to establish baseline classifier functionally for mapping between utterances and a class using common parameter setting (e.g., those recommended by developer, or established settings developed a user), while the development data 36 is used to optimize the parameters for an update candidate. Once the update candidate's parameters are tuned, the update generation speech recognizer generates a hypothesis that can subsequently be tested in the comparison component 17 that compares the performance of the update candidate against the initial set of semantic classifiers.

Returning to FIG. 5, the system 1 includes a program 17 for, when executed by the processor, comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers.

Figure 7:
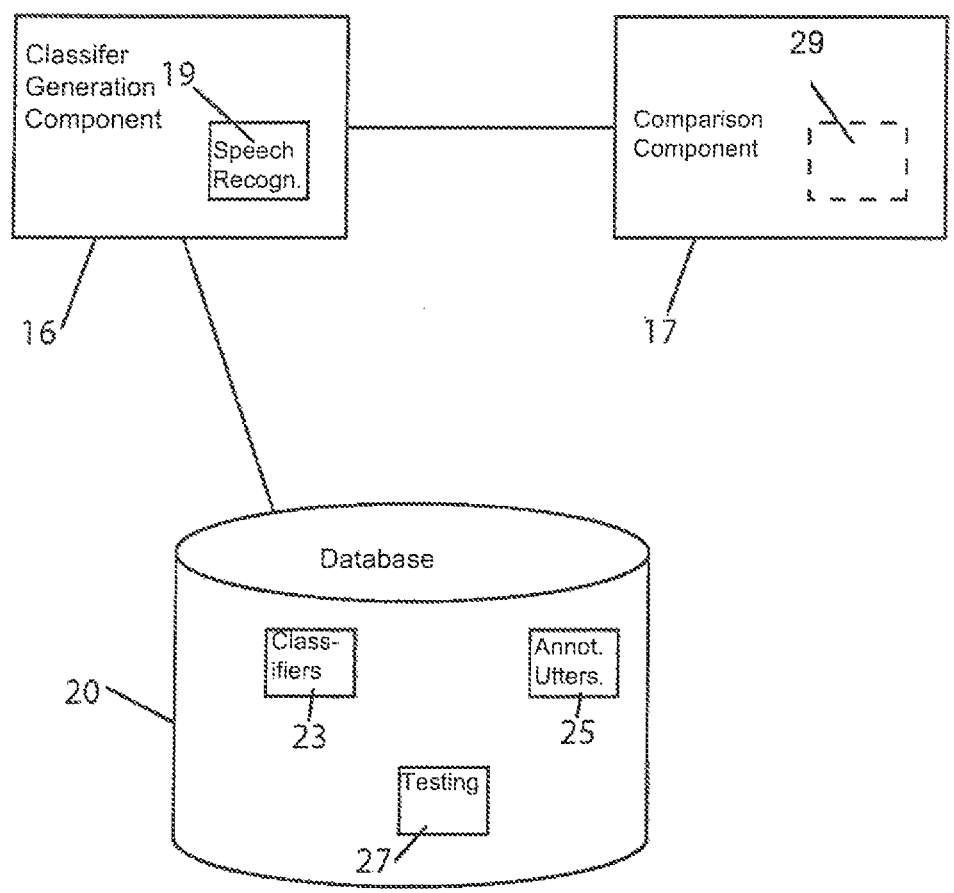
FIG. 7 shows an example of a comparison component according to one embodiment of the invention.

For example, in one embodiment, shown in FIG. 7, the comparison component 17 can optionally include a speech recognizer 15. The comparison speech recognizer 29 is applied to the testing data 27 and produces a hypothesis which is classified using the initial classifiers 23, thereby producing a baseline classification result. The baseline classification is then compared to the annotation data 25 (e.g., for the percentage of matches) to produce a baseline criterion, (e.g., a score).

Figure 8:
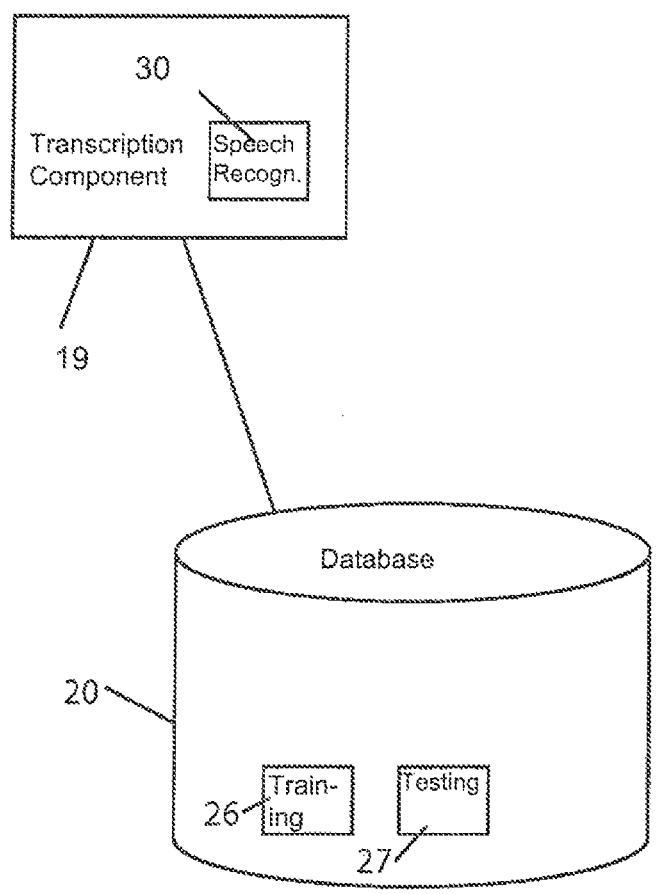
FIG. 8 shows an embodiment of an example of a transcription component according to one embodiment of the invention.

FIG. 8 shows an embodiment of a transcription component 19 for inclusion into the dialog system 1 and adapted to perform automated transcription of the utterances. As explained above, for transcription, the training data 26 and testing data 27 used to generate a new classifier or update classifier parameters can also be used to train one or multiple speech recognizers specific to typical data processed by the spoken dialog system 1. Training a speech recognizer can include the training of language models and/or acoustic models; it can be one global speech recognizer or multiple speech recognizers, such as multiple context-specific speech recognizers. This speech recognizer or these speech recognizers can be used to automatically transcribe new collected utterances.

As shown therein, the transcription component 19 is operatively connected to a data store for training data 26, and a data store for testing data 27. The transcription component 19 includes a speech recognition engine 30. The transcription speech recognizer 30, once trained, can automate the transcription by transcribing the utterances. The transcription component 19 receives a hypothesis and a confidence score for a hypothesis for an utterance processed by the speech recognizer 30. A threshold corresponds to the confidence score. A threshold can include establishing a maximum error threshold and applying the speech recognizer 30 to testing data such as a set of test utterances that are distinct from the utterances the speech recognizer 30 was trained on (e.g., for a context-specific speech recognizer), thereby producing speech recognition hypotheses and confidence scores for each of the processed utterances. The transcription component 19 determines a minimum confidence score for which those utterances whose confidence score exceeds this minimum score produces an error lower than the maximum error threshold. The error threshold can include error rates such as a word error rate, sentence error rate, or both. The confidence score is then tested against the threshold by an appropriate program or algorithm. The hypothesis is accepted for the automated transcription if the confidence score meets the threshold.

In one embodiment a remote hosting service can be provided for at least one of the steps of the optimization process as described above. In such an embodiment, for instance, an initial set of semantic classifiers and utterances that have been collected, processed, transcribed and annotated by a service provider could be sent via an output for sending data over a network to a remote service. The remote service can host programs for applying quality assurance criteria to the annotated utterances, generating update candidates, and comparing performance of the update candidate against the initial classifiers. If the update candidate outperforms the initial classifiers, the update candidate can be sent back via an output for sending data over a network back to the service provider, who can accept the data via an input and update the classifiers with the update candidate. Such an embodiment could be implemented in an iterative cycle.

In another embodiment, a module that can be incorporated into a spoken dialog system can perform at least one of the steps of the optimization process as described above. For example, a separate module that contains programs for applying quality assurance criteria to annotated utterances, generating update candidates, and comparing performance of the update candidate against inputted classifiers can be incorporated "on-site" into a spoken dialog system. An initial set of semantic classifiers and utterances that have been collected, processed, transcribed and annotated by a service provider could be input into the module. If the update candidate outperforms the initial classifiers, the update candidate can be output from the module to the spoken dialog system to update the classifiers with the update candidate. Such an embodiment could be implemented in an iterative cycle. Thus, for example, as shown in FIG. 5, the system can optionally include an upgrading component 33 including a program that, when executed by the processor, comprises: program instructions for performing an automated upgrade of the initial semantic classifier with the update candidate, which could further include program instructions for repeating the optimization process in an iterative cycle. Such a component could be hosted remotely or installed as a module.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for optimizing speech processing in a spoken dialog system, comprising a computer including a processor, and memory, wherein the computer is configured to execute at least one of the steps of the method, the method comprising:

providing the spoken dialog system with an initial set of semantic classifiers;

collecting and processing a plurality of utterances using the semantic classifiers with the spoken dialog system;

transcribing the collected set of utterances;

annotating the collected utterances with a semantic category;

applying a quality assurance criterion to the annotated utterances;

if the quality assurance criterion is met, training a classifier update candidate for the initial set of semantic classifiers using data from the annotated utterances;

comparing a performance of the update candidate against the initial set of semantic classifiers by testing the update candidate and the initial set of semantic classifiers against a baseline criterion; and upgrading the initial set of semantic classifiers of the spoken dialog system with the update candidate if the update candidate outperforms the initial set of classifiers;

wherein the quality assurance criteria are selected from at least two or more of the group consisting of:

completeness of the annotated utterances;

consistency of the annotated utterances;

congruence of the annotated utterances;

correlation of the annotated utterances;

confusion of the annotated utterances;

coverage of the annotated utterances; and corpus size of the annotated utterances.

2. The method of claim 1 wherein the utterance collection is selected from the group consisting of:
   all contexts of the spoken dialog system;
   a subset of contexts of the spoken dialog system;
   a fixed number of utterances per context of the spoken dialog system; and
   all utterances processed by the spoken dialog system in a certain time frame.

3. The method of claim 1 wherein the method further includes:
   deriving testing data and training data from the data from the annotated utterances.

4. The method of claim 3 wherein the method further includes:
   further deriving development data and training data from the training data.

5. The method of claim 4 wherein the development data is used to optimize the parameters used to generate the classifier update candidate.

6. The method of claim 1 wherein the method includes:
   logging data associated with the collected set of utterances.

7. The method of claim 6 wherein the logging data includes:
   storing instances of speech recognition events identified by a speech recognition device at the semantic classifiers together with logging data for the semantic classifiers.

8. The method of claim 7 wherein the logging data is selected from the group consisting of:
   a name and version of an active classifier;
   a classifier name and version resulting in a highest classification score of the utterance;
   date and time in which the utterance was recognized;
   data about a context in which the utterance was recognized;
   the speech recognizer's hypothesis of the utterance;
   an acoustic confidence score associated with the speech recognizer's hypothesis of the utterance;
   the speech recognizer's n best hypotheses of the utterance;
   an acoustic confidence score associated with the n best hypotheses of the utterance;
   a semantic classification, result for the speech recognizer's hypothesis;
   a semantic confidence score associated with the semantic classification result;
   m best semantic classification results selected from a plurality of the semantic classification results for the speech recognizers hypothesis;
   a semantic confidence score associated with the in best semantic classification results;
   m·n best semantic classification results for the n best speech recognition hypotheses;
   a semantic confidence score associated with the m·n best semantic classification results;
   speech data;
   data about a spoken dialog system;
   data about a caller; and
   data about the utterance.

9. The method of claim 1 wherein the trained, update candidate is used to replace classifier parameters with new parameters while keeping the initial classifier in place.

10. The method of claim 1 wherein the trained update candidate is used to replace the initial classifier with a new classifier.

11. The method of claim 10 wherein the new classifier is selected from the group consisting of a rule-based classifier, a statistical classifier, or a classifier that is part rule-based and part statistical.

12. The method of claim 1 wherein the method further includes:
   using the data from the annotated utterances to automate either or both of the transcription and annotation of utterances.

13. The method of claim 12 wherein the training further includes
   training a speech recognizer using the data from the transcribed utterances, the speech recognizer being configured to respond to specific data processed by a specific spoken dialog system.

14. The method of claim 13 wherein the training is selected from the group consisting of:
   training of language models;
   training of acoustic models;
   training a global speech recognizer; and
   training a context-dependent speech recognizer.

15. The method of claim 14 wherein the method further includes:
   automating the transcription by transcribing the utterances using the trained speech recognizer.

16. The method of claim 15 wherein the method further includes:
   receiving a confidence score for the utterance from the speech recognizer;
   establishing a threshold corresponding to the confidence score;
   testing the confidence score against the threshold; and
   accepting the automated transcription if the confidence score meets the threshold.

17. The method of claim 16 wherein establishing a threshold corresponding to the confidence score includes:
   establishing a maximum error threshold;
   applying the speech recognizer to a set of test utterances distinct from the utterances the speech recognizer was trained on producing speech recognition hypotheses and confidence scores for each of the processed utterances; and
   determining the minimum confidence score for which those utterances whose confidence score exceeds this minimum score produce an error lower than the maximum error threshold.

18. The method in claim 17 wherein the error threshold is selected from the group of word error rate and sentence error rate.

19. The method of claim 12 wherein the annotation includes partially automating the annotation.

20. The method of claim 12 wherein the method includes:
   performing automated annotation of utterances based on models trained on the data from the annotated utterances.

21. The method of claim 12 wherein an utterance that is similar or identical to a previously annotated utterance is automatedly assigned the same semantic class as the previously annotated utterance.

22. The method of claim 12 wherein the automated annotation includes applying an initial classifier to the utterances to be annotated.

23. The method of claim 22 wherein the initial classifier is selected from the group consisting of a statistical classifier, a rule-based classifier, and a classifier that is partially rule-based, partially statistical.

24. The method of claim 1 wherein the comparing includes:
measuring baseline performance by applying a baseline classifier to a speech recognition hypotheses generated by the speech recognizer on the stored data about utterances.

25. The method of claim 1 wherein the comparing includes:
measuring the baseline performance by comparing output classes produced by the set of classifiers used by the system applied to a speech recognition hypotheses generated by the speech recognizer for given utterances with the annotations of the same utterances.

26. The method of claim 1 wherein the upgrading is selected from the group consisting of:
manually upgrading the initial semantic classifier with the update candidate; and
performing an automated upgrade of the initial semantic classifier with the update candidate.

27. The method of claim 1 wherein the method further includes:
repeating the optimization process in an iterative cycle.

28. The method of claim 27 wherein the method further comprises, when the update candidate does not outperform the initial semantic classifier;
maintaining the initial semantic classifier;
continuing the collection of utterances; and
repeating the optimization process.

29. The method of claim 1 wherein the method further comprises, when the initial set of semantic classifier are upgraded with the update candidate,
repeating the optimization process using the updated classifiers as the initial set of classifiers in a next iteration.

30. The method of claim 1 wherein the method further comprises;
providing a remote hosting service for at least one of the steps of the optimization process.

31. The method of claim 1 wherein the method further comprises:
incorporating a module into a spoken dialog system for at least one of the steps of the optimization process.

32. A spoken dialog system, comprising:
a computer including a processor, and memory, including:
a signal input for receiving an audio input;
a speech recognition engine;
a data store comprising an initial set of semantic classifiers;
a data store for a plurality of utterances received via the audio input;
a data store for storing transcribed utterances;
a data store for storing annotated utterances;
a semantic classifier component including a semantic classifier program for, when executed by the processor, mapping the utterances to a set of semantic classes;
a quality assurance component including a program for, when executed by the processor, applying quality assurance criteria to the annotated utterances;
a classifier update generation component including a program for, when executed by the processor, generating an update candidate for the initial set of semantic classifiers using data from the annotated utterances if a quality assurance criterion is met;
and a comparison component including a program for, when executed by the processor, comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers,
wherein the quality assurance criteria are selected from at least two or more of the group consisting of:
completeness of the annotated utterances;
consistency of the annotated utterances;
congruence of the annotated utterances;
correlation of the annotated utterances;
confusion of the annotated utterances;
coverage of the annotated utterances; and
corpus size of the annotated utterances.

33. The system of claim 32 wherein the system further includes:
a data derivation component including a program for deriving testing data and training data from the annotated utterances.

34. The system of claim 33 wherein the system further includes:
an update generation speech recognition engine included in the update generation component and
the deriving component further includes program instructions for further separating the training data into training data and development data.

35. The system of claim 34 wherein the system further includes:
program instructions for, when executed by the processor, optimizing the parameters used to generate the classifier update candidate using the development data.

36. The system of claim 32 wherein the system includes:
a logging component including program for, when executed by a processor, logging and storing data associated with the collected set of utterances.

37. The system of claim 36 wherein the logging data includes:
a data store for storing instances of speech recognition events identified by the speech recognition engine at the semantic classifiers together with logging data for the semantic classifiers.

38. The system of claim 32 wherein the generated update candidate is used to replace classifier parameters with new parameters while keeping the initial classifier in place.

39. The system of claim 32 wherein the generated update candidate is used to replace the initial classifier with a new classifier.

40. The system of claim 32 wherein the system further includes:
a transcription component including a program that, when executed by a processor automates the transcription of the utterances.

41. The system of claim 32 wherein the system further includes:
an annotation component including a program that, when executed by a processor, automates the annotation of the utterances.

42. The system of claim 32 wherein the system further includes:
a program for, when executed by a processor, training a speech recognition engine using the data from the annotated utterances, the speech recognition engine being configured to respond to specific data processed by a specific spoken dialog system.

43. The system of claim 42 wherein the training program includes program instruction for, when executed by a processor:
- training of language models;
- training of acoustic models;
- training a global speech recognizer; and
- training a context-dependent speech recognizer.

44. The system of claim 42 wherein the system further includes:
- a transcription component including a program that, when executed by a processor, automates the transcription of the utterances; wherein said transcription component includes the trained speech recognition engine.

45. The system of claim 44 wherein the transcription component further includes program instructions for, when executed by the processor:
- receiving a confidence score for the utterance from the speech recognition engine;
- establishing a threshold corresponding to the confidence score;
- testing the confidence score against the threshold; and
- accepting the automated transcription if the confidence score meets the threshold.

46. The system of claim 45 wherein the program instructions further include:
- establishing a maximum error threshold;
- applying the speech recognition engine to a set of test utterances distinct from the utterances the speech recognition engine was trained on producing speech recognition hypotheses and confidence scores for each of the processed utterances; and
- determining the minimum confidence score for which those utterances whose confidence score exceeds this minimum score produce an error lower than the maximum error threshold thereby establishing a threshold corresponding to the confidence score.

47. The system of claim 46 wherein the error threshold is selected from the group of word error rate and sentence error rate.

48. The system of claim 32 wherein the system further comprises;
- a comparison speech recognition engine included, in the comparison component;
- and the comparison program including program instructions for, when executed by the processor, measuring baseline performance by applying a baseline classifier to the speech recognition hypotheses generated by the comparison speech recognition engine on the stored data about utterances.

49. The system of claim 32 wherein the comparison program includes program instructions for:
- measuring the baseline performance by comparing the output classes produced by the set of classifiers used by the system applied to the speech recognition engine's hypotheses for given utterances with the annotations of the same utterances.

50. The system of claim 32 wherein the system includes a upgrading program that, when executed by the processor, comprises:
- program instructions for performing an automated upgrade of the initial semantic classifier with the update candidate.

51. The system program of claim 32 wherein the upgrading program further includes program instructions for:
- repeating the optimization process in an iterative cycle.

52. The system of claim 32 wherein the system further comprises:
- a remote hosting service for at least one of the components of the system.

53. The system of claim 32 wherein the at least one of the components of the system includes a separate module that can be incorporated into a spoken dialog system.

* * * * *

UNITED STATES PATENT AND TRADEMARK OFFICE
CERTIFICATE OF CORRECTION

PATENT NO. : 8,543,401 B2
APPLICATION NO. : 12/425892
DATED : September 24, 2013
INVENTOR(S) : David Suendermann et al.

Page 1 of 1

It is certified that error appears in the above-identified patent and that said Letters Patent is hereby corrected as shown below:

In the Claims:

Column 23, claim 8, line 41, after "classification", remove the [,].

Column 23, claim 8, line 48, replace "in" with --$m \cdot n$--.

Column 23, claim 8, line 58, after "trained", remove the [,].

Column 25, claim 29, line 30, change "classifier" to --classifiers--.

Column 26, claim 40, line 54, after "processor", insert a --,--.

Column 28, claim 48, line 6, after "included", remove the [,].

Column 28, claim 50, line 20, change "a" to --an--.

Signed and Sealed this
Fifth Day of November, 2013

Teresa Stanek Rea
*Deputy Director of the United States Patent and Trademark Office*